No. 743,536. PATENTED NOV. 10, 1903.
W. MEINRICH.
METALLIC WHEEL.
APPLICATION FILED AUG. 4, 1903.
NO MODEL.
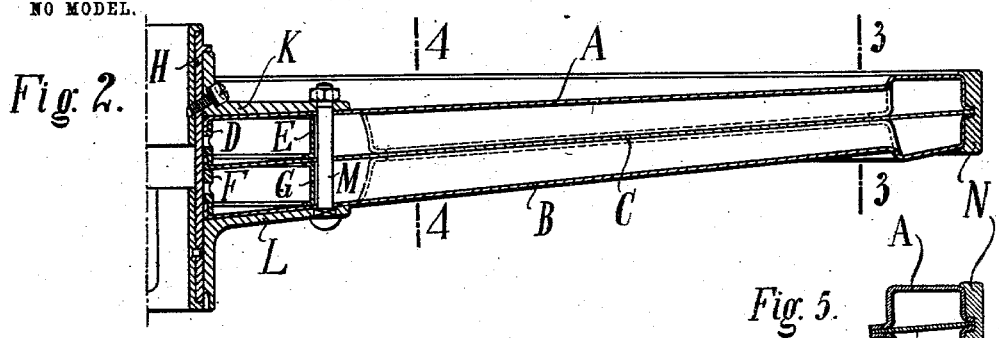
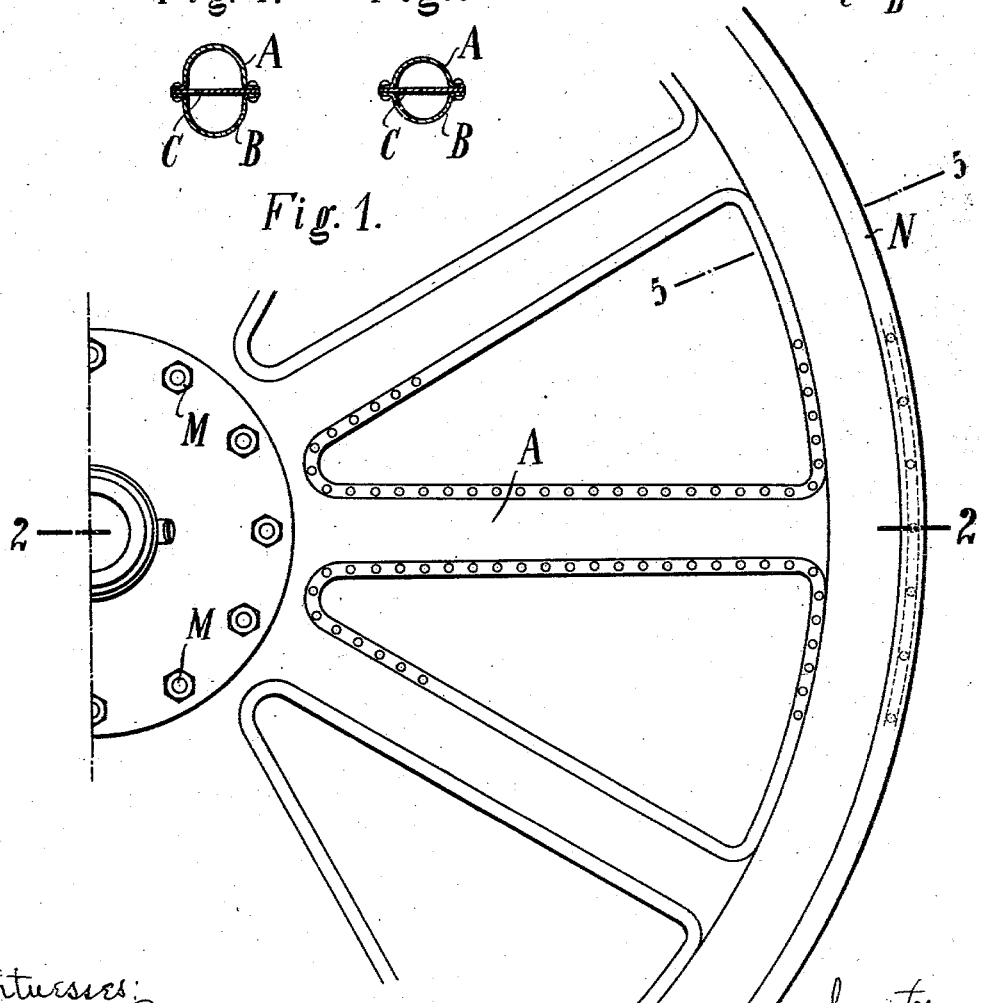

No. 743,536. Patented November 10, 1903.

UNITED STATES PATENT OFFICE.

WILHELM MEINRICH, OF ESSEN-ON-THE-RUHR, GERMANY, ASSIGNOR TO FRIED. KRUPP, AKTIENGESELLSCHAFT, OF ESSEN-ON-THE-RUHR, GERMANY.

METALLIC WHEEL.

SPECIFICATION forming part of Letters Patent No. 743,536, dated November 10, 1903.

Application filed August 4, 1903. Serial No. 168,205. (No model.)

*To all whom it may concern:*

Be it known that I, WILHELM MEINRICH, a subject of the Emperor of Germany, and a resident of Essen-on-the-Ruhr, Germany, have invented certain new and useful Improvements in Metallic Wheels, of which the following is a specification.

This invention relates to wheels pressed from sheet metal; and the object of the invention is by combining two suitably-formed wheel-halves to produce a wheel with hollow spokes and a hollow felly which shall be of comparatively little weight and at the same time exceedingly strong and which shall resemble substantially in appearance the usual wooden wheels.

In the accompanying drawings is shown, by way of example, a construction of wheel according to this invention, the particular construction illustrated being adapted for heavy loads.

Figure 1 is a partial side elevation of the wheel. Fig. 2 is a section on the line 2 2 of Fig. 1. Figs. 3 and 4 are sections of a spoke on the lines 3 3 and 4 4 of Fig. 2, and Fig. 5 is a section of the felly on the line 5 5 of Fig. 1.

Each of the two halves A and B of the wheel is pressed from a metal sheet provided with sector-shaped spaces and has, as shown in the drawings, a hub portion, tapering spokes of semicircular section in a piece therewith, and a trough-shaped felly. To join and stiffen the aforesaid parts, both halves of the wheel are provided with flanges on their inner periphery at the spaces between the spokes and also with flanges on the outer periphery of the felly. The central aperture of the nave is surrounded by a flange to prevent tearing of the plates and to enable the wheel to be properly centered. Between both halves A and B of the wheel is inserted a spoke-plate C, covered by the parts A and B, and which increases the strength of the wheel, the three parts A B C being united by rivets, screws, soldering, or welding. The hub portions of the plates A B C are also supported against each other by distance-rings D E F G, so as to admit of connection with the hub being made sufficiently rigid.

The hub itself consists of the lined hub-socket H and two hub-plates K and L. These latter receive the wheel-plates between them and are drawn tightly together by screw-bolts M, passed through coincident holes in the hub-plates K L and through the hub portions of the wheel-plates A B C. To prevent the hub-plates from revolving on the hub-socket, both portions are screwed or pinned to each other.

The tire N is provided with an internal groove to receive the rib formed by the external flanges of the felly and is pressed onto the felly, so that it is secured against shifting.

In cases where the load to which the wheels are subjected is lighter the center spoke-plate C may be omitted, which will lighten the wheel.

Having thus described the invention, the following is what is claimed as new therein:

1. A spoked wheel composed of two halves, each pressed from a single piece of sheet metal to form one-half of the hub, one-half of the spokes, one-half of the felly, flanges by which the two halves are secured together, and which extend from the spokes throughout their length on both sides, and from the inner and the outer peripheries of the felly, and a tire surrounding the felly and grooved for the reception of the flange on the outer periphery.

2. A spoked wheel composed of two halves, each pressed from a single piece of sheet metal to form one-half of the hub, one-half of the spokes, one-half of the felly, and flanges by which the two halves are secured together, and which extend from the spokes throughout their length on both sides, and from the inner and the outer peripheries of the felly; and a central plate having the form of the hub, the spokes and the fellies and located between the two halves.

3. A spoked wheel composed of two halves, each pressed from a single piece of sheet metal to form one-half of the hub, one-half of the spokes, one-half of the felly, and flanges by which the two halves are secured together, and which extend from the spokes throughout their length on both sides, and from the inner and the outer peripheries of the felly; and distance-rings positioned in the hub between the two halves.

4. A spoked wheel composed of two halves, each pressed from a single piece of sheet metal to form one-half of the hub, one-half of the spokes, one-half of the felly, and flanges by which the two halves are secured together, and which extend from the spokes throughout their length on both sides, and from the inner and the outer peripheries of the felly; a central plate having the form of the hub, the spokes and the fellies and located between the two halves; distance-rings positioned upon both sides of the central plate; and a hub-plate on each side of the hub.

The foregoing specification signed at Dusseldorf this 22d day of July, 1903.

WILHELM MEINRICH.

In presence of—
  WILHELM ESSENWEIN,
  PETER LIEBER.